United States Patent Office 3,598,540
Patented Aug. 10, 1971

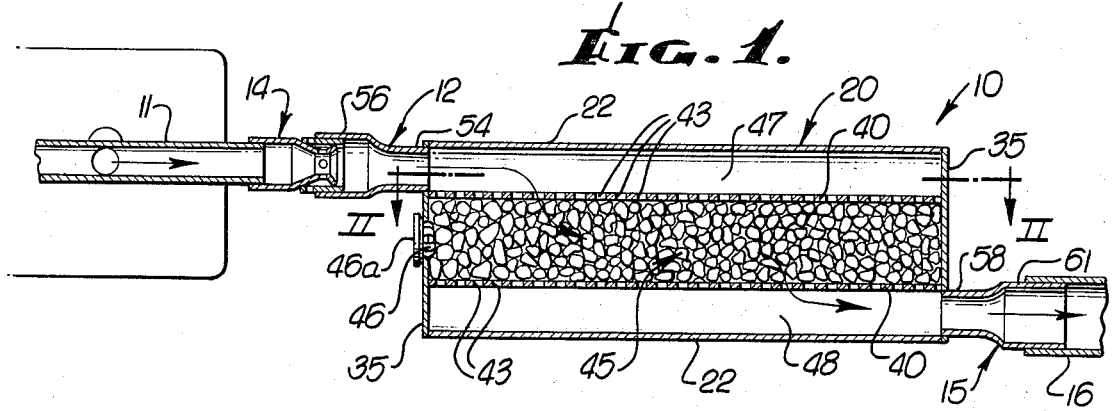
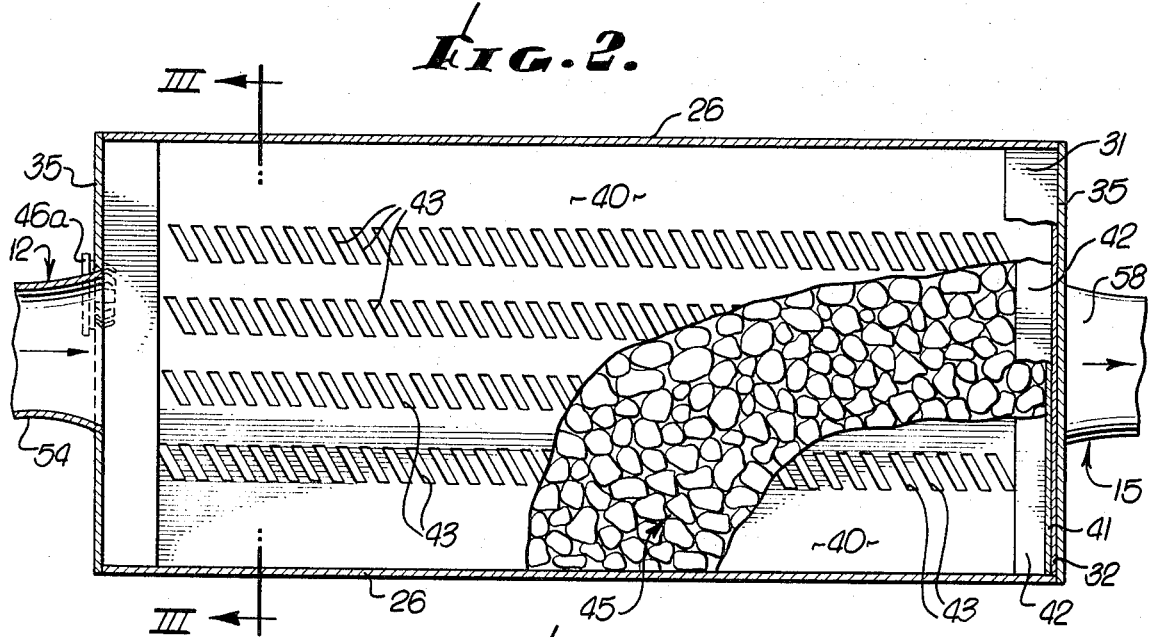
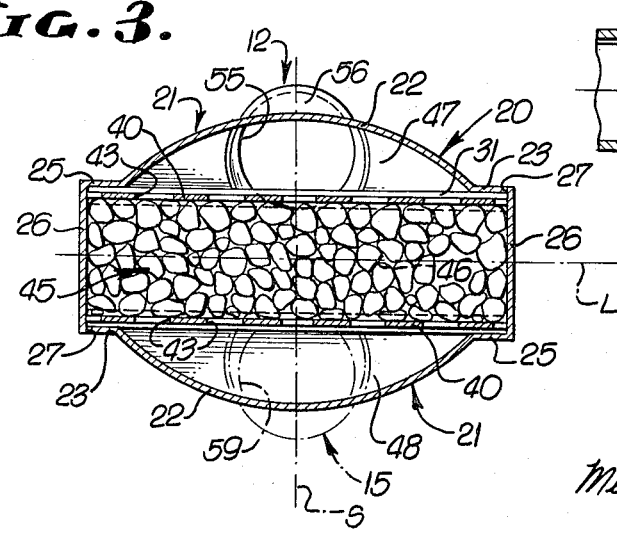
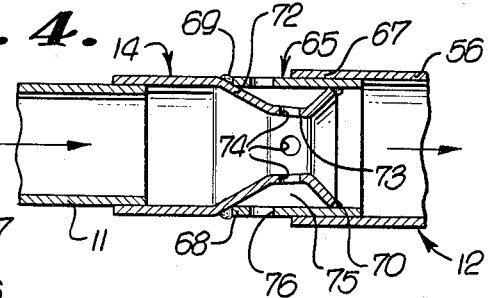

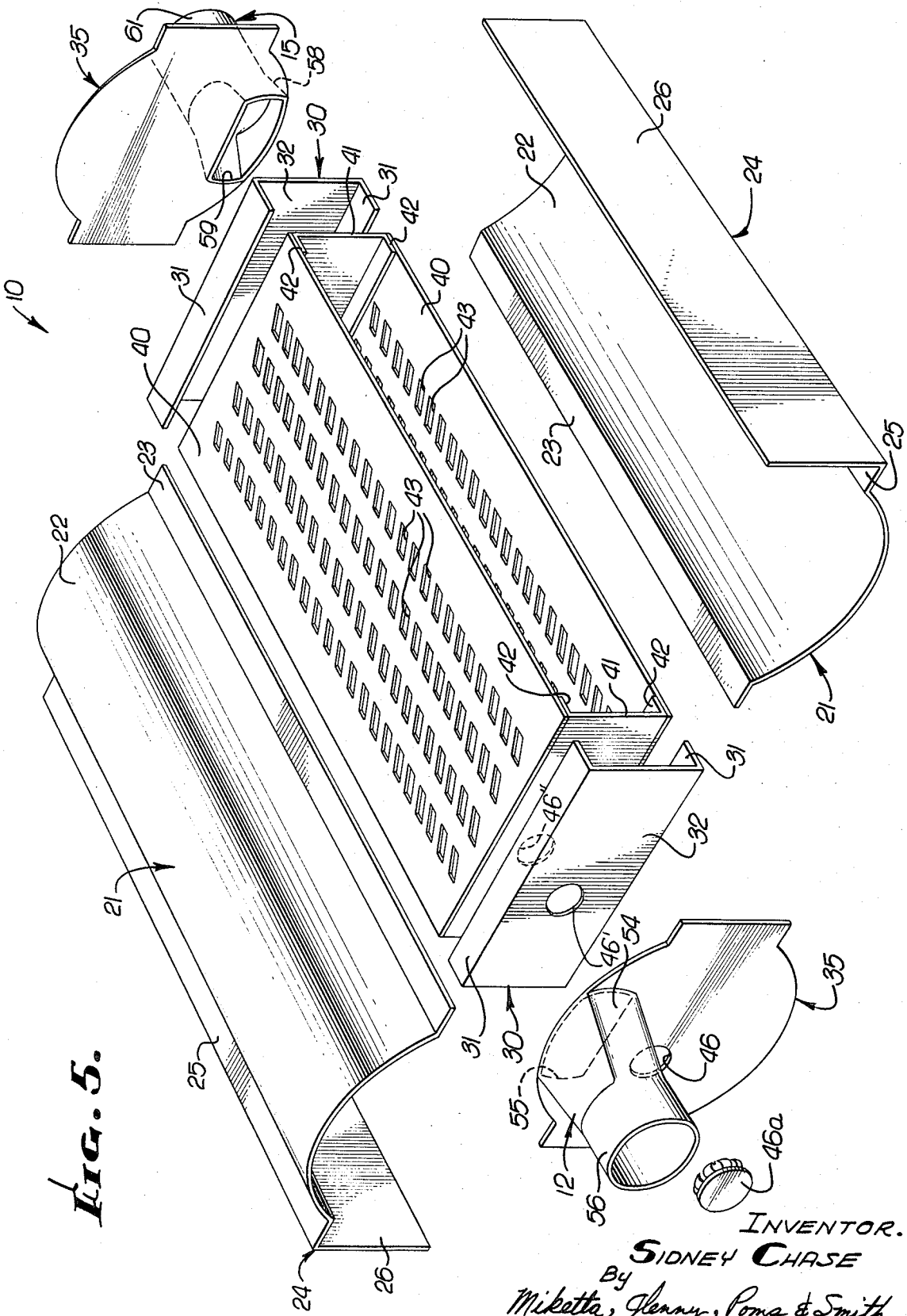

3,598,540
CATALYTIC EXHAUST GAS PURIFYING DEVICE
AND CASING MEANS THEREFOR
Sidney Chase, 11914 Darlington, Apt. 4,
Los Angeles, Calif. 90049
Filed Apr. 2, 1969, Ser. No. 812,818
Int. Cl. B01j 9/00
U.S. Cl. 23—288                                    5 Claims

ABSTRACT OF THE DISCLOSURE

A catalytic exhaust gas purifying device utilizing a bed of catalytic material and including a casing means and venturi means constructed and arranged to provide decreased warmup time for commencing operation of the device and to utilize a mode of construction of the casing means and venturi means which enhances not only operating efficiency but also the facility by which the device can be mounted on a vehicle under restricted space conditions.

BACKGROUND OF INVENTION

Catalytic exhaust gas purifying devices have been utilized to reduce or eliminate harmful components of exhaust gases from internal combustion engines, such harmful components generally comprising saturated and unsaturated hydrocarbons, nitrogen oxides, and mixtures of carbon monoxide and other constituents. The emission of such harmful components from an exhaust pipe of an internal combustion engine varies with respect to the operating condition of the engine, that is the harmful exhaust gas emission will vary between idle, full speed, accelerating, and decelerating conditions. The efficiency of such catalytic devices is held to a high standard when used in connection with automobiles which normally operate outside buildings or plants. Internal combustion type engines are often used on material handling equipment within buildings, plants, warehouses or other confined enclosures for transporting and moving various materials and articles. Under such inside conditions it becomes even more important to reduce the harmful components of exhaust gas emissions which result in haze, eye irritation, and gaseous mixtures including carbon monoxide which are not only obnoxious but under some circumstances detrimental to health and efficiency of persons working within the building. Such vehicles are usually forklift trucks, transporters or other similar material handling equipment. Such equipment is often powered by internal combustion type engines which are carried on a vehicle chassis with minimum space for mounting an engine and its muffler. Since the operator of such a material handling vehicle operates the vehicle from a position quite close to the engine and exhaust means therefor, it is important that parts of the power unit, which may become quite hot during operation, are recessed or covered so that normal movement of an operator will not cause contact therewith.

Heretofore, such material handling vehicles have provided little available space for the mounting and carrying of catalytic devices with a result that it has become extremely difficult and often impossible to mount such a device in a protected safe position on the vehicle chassis. Heretofore, prior proposed catalytic devices included a cylindrical shell connected with relatively long pipe and fittings to the exhaust pipe of the engine, the shell being mounted wherever possible on the chassis and often with exposed parts of the cylindrical shell extending beyond the chassis, thus creating a dangerous hazard to the operator and others. Such prior mountings often included connecting pipe having bends and restrictions therein which caused undue loss of heat and a reduced flow rate of exhaust gas.

The present invention contemplates a catalytic exhaust gas purifying device wherein a casing means of novel construction and arrangement is employed together with a readily removable and replaceable venturi means whereby an efficient readily mountable catalytic purifying device is afforded.

An object of the present invention is to disclose and provide a novel casing means for a catalytic exhaust gas purifying device wherein the construction provides a reduced metal mass and surface area which contributes to a decrease in warmup time for the catalytic material to reach operating temperature.

Another object of the invention is to disclose and provide a casing means for a catalytic exhaust gas purifying device of generally elliptical configuration and whereby a maximum depth of catalytic bed is provided and is approximately one-half the length of the minor axis of the elliptical construction, the construction of the means containing the catalytic bed being capable of withstanding sustained operating temperatures without loss of dimensional stability.

A further object of the invention is to disclose and provide a casing means for a catalytic exhaust gas purifier device which includes a novel construction for facilitating the mounting of means containing for catalytic pellets and at the same time facilitates external mounting of the device on a chassis in limited spaced requirements.

A further object of the invention is to disclose and provide a purifier device as described above wherein means are provided for mounting a venturi means in close straight line association with the device and exhaust manifold outlet.

Other advantages and objects of the present invention include the construction and arrangement of a casing means which may be readily manufactured so that exhaust gas purifying devices of different capacity may be readily fabricated, the provision of a relationship between the surface area of the metal of the casing and the volume of the catalytic bed so that the device is operable during idle, acceleration, deceleration and full speed conditions of the engine, the provision of a minimum number of parts to construct such a casing means, the provision of a venturi construction of very light weight and which can be readily installed and the provision of a casing means readily installed in confined locations in most material handling vehicles.

Various other objects and advantages of the present invention will be readily apparent from the following description of the drawings in which an exemplary embodiment of the invention is shown.

In the drawings:

FIG. 1 is a longitudinal vertical sectional view of a catalytic exhaust gas purifying device embodying this invention.

FIG. 2 is a transverse sectional view taken in the horizontal plane indicated by line II—II of FIG. 1.

FIG. 3 is a transverse sectional view taken in the vertical plane indicated by line III—III of FIG. 2.

FIG. 4 is an enlarged fragmentary longitudinal sectional view taken in a vertical plane bisecting a venturi means shown in FIG. 1.

FIG. 5 is an exploded perspective view of the device shown in FIG. 1.

Referring to the drawings FIG. 1 illustrates a catalytic exhaust gas purifying device indicated at 10 embodying this invention. Generally speaking, the device 10 is connected with an internal combustion type engine (fragmentarily shown) which includes an exhaust manifold or exhaust gas pipe 11 for normally conducting exhaust gases to atmosphere. Device 10 is readily connected to such an exhaust pipe by an inlet fitting 12 and a readily attachable venturi means 14 described hereinafter in detail and installed closely adjacent to device 10 and with a minimum of space from exhaust manifold 11 to reduce loss of heat therefrom. The flow of the exhaust gas passes through device 10 and is discharged through an outlet fitting 15 which may be connected to a discharge pipe 16 for conducting the treated gas to a selected location for discharge to atmosphere.

The novel construction of the catalytic exhaust gas purifying device 10 which provides efficient functioning thereof may be best seen in FIGS. 3 and 5. Device 10 comprises a casing means 20 of generally elliptical transverse configuration including a major axis L and a minor axis S. The casing means embodies a novel arrangement to achieve effective operation and to facilitate assembly and may include companion casing portions 21 of identical cross-sectional configuration, preferably formed from suitable sheet metal or sheet stainless steel. Casing portions 21 may be cut to selected length from the same formed sheet metal workpiece, the length selected depending upon the desired capacity of the purifier device. Each casing portion 21 includes a wall 22 of part elliptical section having one longitudinal edge merging with an edge flange 23 disposed in a plane parallel to the major axis of the elliptical configuration. Along the other longitudinal edge of wall 22 is integrally formed an angle section edge portion 24, the short leg 25 of said portion 24 lying in the same plane as flange 23 and being of virtually the same width as flange 23. Leg 26 of angle portion 24 is disposed at right angles to leg 25 and has a selected width depending upon the depth of the catalytic bed to be provided in the device 10. Thus, the two casing portions 21 may be placed in opposed relation to form an outer continuous shell or casing with the flange 23 of one portion in edge abutment as at 27 with the edge of flange 23 of the other portion (FIG. 3).

When casing portions 21 are placed in mating or companion assembled relationship, inwardly facing end channel section members 30 provide transversely extending channel flanges 31 joined by an imperforate web 32. In assembly, corners of flanges 31 seat as at 32 upon end areas of flanges 23 and corresponding legs 25 of casing portions 21.

End plates 35 having an overall configuration corresponding to the generally elliptical transverse configuration of casing means 20 may be seated against the outer face of web 32 with edge margins abutting as at 36 end edges of casing portions 21. When end plates 35 are assembled with channel section members 32 and the casing portions 21, a closed hollow chamber 37 is defined thereby.

Within hollow casing 20 and chamber 37 may be positioned a pair of parallel rectangular slotted, perforated or foraminous walls 40 mounted upon end spacer walls 41 having inturned top and bottom edge portions 42 for supporting said perforated walls 40. Edge portions 42 may be secured in any suitable manner to spacer walls 41. Each wall 40 includes a plurality of spaced slots or openings 43 in this example arranged in rows, and having a sufficient aggregate flow area for permitting desired flow of gases from one side of said spaced perforated walls 40 to the other side thereof. When as assembled with casing 20, end channel section members 30 embrace and snugly fit over walls 41 and end edge margins of perforated wall 43, and longitudinal edges of walls 40 and 41 are disposed in abutting relationship with legs 26 of casing portions 21. Thus, spaced walls 40 and legs 26 with end walls 41 provide means for containing a selected quantity of catalytic material, the containing means having a width approximately equal to the major axis L and a depth approximately one-half the minor axis S.

The catalytic material generally indicated at 45 FIG. 2 may comprise any suitable well known catalytic pellet type material to provide a catalytic bed of suitable density and pellet size for passage therethrough of exhaust gases. Catalytic material 45 may be fed by gravity into the containing means through inlet fill openings 46, 46', 46'' provided in end plate 35, member 30 and member 41, respectively. A closure 46a of suitable type, such as snap-fitted, may close opening 46. Catalytic material 45 fed into the containing means may be subjected to vibration during the filling operation to provide a selected path or density of catalytic material in the containing means. The catalytic material completely fills the containing means with a minimum of voids between the pellets to provide a stable mass of catalytic material of uniform depth and density regardless of whether device 10 is in vertical or horizontal position or other orientation. It will be understood that such catalytic material enters into a reaction with exhaust gases and the carbon monoxide, hydrocarbons and oxygenated organic compounds which might be present in the exhaust gases will be oxidized in the catalyst bed. Heat liberated from such oxidation plus the heat present in the exhaust gases will maintain the pellets at an elevated temperature in the order of 700–800°. Gases passing through the discharge outlet 15 will contain only a small fraction of their original contaminates, and particularly carbon monoxide will be reduced normally acceptable standards.

The walls 40 define with the part elliptical or curved walls 22 of casing portions 21 an inlet chamber portion 47 and an outlet chamber portion 48. Inlet chamber portion 47 is fed exhaust gases through inlet fitting 12 which may have an outwardly flared and vertically flattened end section 54 secured as by welding to end plate 35 at a correspondingly shaped opening 55 therein. A short distance from plate 35 inlet fitting 12 is provided with a cylindrical end section 56 for a slidable connection to venturi means 14. A similar construction is provided at the opposite end plate 35 except that the fitting is employed as a discharge outlet. Outlet fitting 15 similarly includes the somewhat flattened, outwardly flared end section 58 of the same configuration as an outlet opening 59 which leads from outlet chamber 48. Similarly, outlet fitting 15 terminates in a cylindrical end section 61 adapted to be fitted to a suitable pipe or conduit. It will be readily apparent from FIG. 5 that end plates 35 and their fittings 12 and 15 are virtually identical and that such plates may be interchanged during construction and assembly of the device 10.

Inlet fitting 12 may receive within its cylindrical end section 56 venturi means 14 which conducts exhaust gas from exhaust pipe 11 to device 10. Venturi means 14 is constructed in novel manner to facilitate installation and removal between exhaust manifold 11 and fitting 12 and comprises an outer tubular member 65 having one end formed with an outer diameter adapted to slidably fit as at 67 into end section 56 of fitting 12. At its other end 68 tubular member 65 may be brazed or welded at 69 to venturi member 72.

Within tubular member 65 and extending from end 68 of member 65 is venturi member 72 secured at its other end at 70 to the end of tube 65. Venturi member 72 provides a venturi throat 73 of selected diameter and in close spaced relation to throat 73 and on the downstream side thereof may be provided a plurality of orifices 74 of selected flow area. Orifices 74 communicate with an annular plenum chamber 75 which surrounds venturi member 72 and which receives atmospheric air through enlarged openings 76 in member 65 and arranged generally opposite the orifices 74. It will thus be apparent that when exhaust gases flow through pipe 11 into venturi means 14 and through venturi throat 73, that the flow rate of the gas will be accelerated and that atmospheric air will be aspirated through orifices 74 into such gas flow to provide a selected supply of air for the catalytic reaction which occurs in the catalytic bed 45. Thus, additional air will be supplied in preselected quantities depending upon the flow area size of openings 76 and orifices 74.

It is important to note that the configuration of device 10 facilitates its placement and location close to the end of an exhaust manifold or exhaust pipe, such facility of location being particularly applicable with respect to material handling equipment such as forklift trucks. As best seen in FIG. 1 and schematically illustrated therein, the path of exhaust gas flow from exhaust manifold 11 to device 10 in a straight line and of relatively short distance. Thus, loss of heat of the gas as it flows from the exhaust manifold to the device 10 is reduced to a minimum and more heat is available for bringing the catalytic material in device 10 to operating temperature. Thus, the savings in such heat energy is a factor in reducing the time required for device 10 to come to operating temperature.

Another factor in reducing the time for bringing device 10 to operating temperature includes the novel construction of casing means 20 since casing means 20 may be constructed of thinner gauge sheet material, as for example 18 gauge, while still maintaining structural rigidity of the casing means and of the means containing the catalytic material under operating temperatures of about 700° to 800° F. Since casing means 20 is constructed of thinner gauge sheet material and since the generally transverse elliptical configuration together with the structural arrangement of the casing means reduces substantially the aggregate metal surface area of device 10, there is a reduction of overall surface area of metal to be heated and loss of initial heat by heating of the metal casing is reduced and such loss of heat becomes available for heating the catalytic material.

The combination of conservation of heat between the exhaust manifold and the catalytic material in device 10 together with the particular construction of device 10 which requires less heat to bring it to an operating temperature provides a purifier device which is capable of operating at engine idle speeds and also during acceleration, deceleration or full speed and without the requirement of an engine speed control or governor to assure that a sufficient amount of heat is present in the catalytic device to maintain the catalytic reaction.

The supply of air to device 10 to produce and sustain the desired catalytic reaction is provided by the venturi means 14 which aspirates a preselected amount of atmospheric air into the gas flow. Internal combustion engines may be operated with leaded gas, white gas or LPG and such gases are burned at different rates and have different characteristics. Thus, depending upon the type of fuel being used in the internal combustion engine it may be desirable to modify the amount of secondary air aspirated into the exhaust gas flow through the venturi means 14, which preferably is about two to three inches long, is readily disassembled from the exhaust pipe 11 and inlet fitting 12 since a sliding fit is provided therewith. Thus, movement of device 10 longitudinally for approximately an inch or more will permit convenient disassembly of venturi means 14 from the exhaust pipe and permits replacement thereof with a venturi means of similar configuration having a different venturi throat size or a venturi having different sized air aspirating orifices. Thus, unit replacement of venturi means 14 is simply and readily accomplished without the necessity of disassembling numerous pipe fittings, connections and the like.

By employing in device 10 a catalytic bed of virtually maximum effective thickness it has been found that effective efficient operation of the catalytic device can be achieved by modifying the length of the casing means into three sizes to provide preselected suitable capacity and to modify the throat size and aspirating air orifices of venturi means 14 also into approximately three sizes. Thus, the catalytic device 10 is readily adaptable to different internal combustion engines having different operating characteristics and employing different types of fuel.

As mentioned above, one of the factors which contributes to the efficient operation of catalytic device 10 is the straight line flow of exhaust gases from the exhaust manifold to the intake chamber portion 47 through inlet fitting 12 and where the only restriction of flow area occurs at the venturi throat of the venturi means 14. While the example described shows the inlet fitting 12 and outlet fitting 15 disposed at ends of the casing means 20, it will be readily understood that the outlet fittting 15 may be at the same end as inlet fitting 12 or that the inlet and outlet fittings may be provided in the curved wall 22 of the casing portion 21, the inlet and outlet fittings being arranged in any suitable location depending upon the requirements of the particular installation. In any of these examples it will be understood that such changes are made so that the flow path of the exhaust gas from the exhaust manifold to the intake chamber portion 47 will be essentially a straight unrestricted path.

It may also be noted that the means containing the catalytic pellets 45 includes reduction of metal by employing a single wall 26 of the casing means and a reduction in surface area provided by the curved configuration of wall 22 as compared to other configurations. In this example the aggregate surface area in square inches of said casing means is related in the order of about two to one to the volume in cubic inches of said catalytic bed. An exemplary aspect ratio of the general elliptical configuration of device 10 is approximately two to three in order to provide the efficient operating characteristics described above. Such aspect ratio provides a thickness of catalytic bed or distance between perforated walls 40 of approximately one-half the minor axis of the elliptical configuration, and thus, a maximum depth of catalytic bed is provided in a casing configuration which lends itself to convenient installation in locations where space requirements are critical.

It should also be noted that the angle section edge portions 24 and flanges 23 at sides of casing means 20 provide convenient rectilinearly arranged external surfaces for facilitating positioning and mounting device 10 on brackets frame members of a chassis.

It will be understood that various modifications and changes may be made in the catalytic exhaust gas purifier device described above which come within the spirit of the invention and all such changes and modifications coming within the scope of the appended claims are embraced thereby.

I claim:
1. In a device adapted to contain catalytic material, the combination of:
  an outer elongated casing means of generally elliptical transverse configuration and having a transverse major axis and a minor axis;
  means for containing catalytic material within said casing means and having a width virtually equal to the length of said major axis and a depth equivalent to approximately one-half the minor axis,
  said containing means extending for substantially the length of the casing means,
  said containing means including spaced parallel perforate walls having longitudinal edge margins and joined by opposed end walls;
  said casing means including a pair of companion casing portions made of preformed sheet material,
  each casing portion being of substantially identical cross-sectional shape and each casing portion having a planar edge flange along one edge and having a right angle section edge portion along the opposite edge cooperable with said edge flange of the companion casing portion to support and enclose longitudinal edge margins of said perforate walls for the length of said casing means;
  each casing portion having a convex wall extending between its edge flange and angle edge portion to define with the opposed perforate wall a chamber;
  said edge flanges and said angle section edge portions forming planar external supporting surfaces for said casing means;

end members interconnecting said angle section edge portions and covering end portions of said containing means;

end plates connecting ends of said casing portions and covering said end members;

a port means in said casing means, one port communicating with one chamber and the other port communicating with the other chamber;

and a filling port and closure means therefor in said casing means aligned with the inside of and communicating with the containing means for filling the containing means.

2. A device as stated in claim 1 wherein the aggregate surface area in square inches of said casing means is related in the order of about two to one to the volume in cubic inches of said means for containing catalytic material.

3. In a device as stated in claim 1 wherein said angle section edge portions and edge flanges of said casing portions include said supporting surfaces in rectilinear relationship for facilitating stable positioning of said device on a vehicle.

4. A device as stated in claim 1 including venturi means connected with one of said ports in proximate relation thereto;

said venturi means having means for aspirating air into the flow path at said one port means, said venturi means including an outer tubular member and a venturi member secured with said outer tubular member and provided with a venturi throat portion, said venturi member and said outer tubular member defining a chamber, said throat portion and said outer tubular member each having air aspirating means communicating with said chamber, said venturi member having means for slidably connecting an exhaust gas pipe thereto.

5. In a device adapted to contain catalytic material, the combination of:

an outer casing means of generally elliptical transverse configuration and having a major axis and a minor axis;

means for containing catalytic material within said casing means and having a width virtually equal to the length of said major axis and a depth equivalent to approximately one-half the minor axis, said containing means including spaced perforate walls having longitudinal edge margins;

said casing means including a pair of companion casing portions made of preformed sheet material, each casing portion being of similar cross-sectional shape and each portion having an edge flange along one edge and having an angle section edge portion along the opposite edge cooperable with said edge flange of the companion casing portion to support and enclose longitudinal edge margins of said perforate walls;

each casing portion having a convex wall extending between its edge flange and angle edge portion to define with the opposed perforate wall a chamber;

said edge flanges and said angle section edge portions forming planar external supporting surfaces for said casing means;

end members interconnecting said angle section edge portions and covering end portions of said containing means;

end plates for said casing means;

a filling port and closure means therefor in said casing means aligned with the inside of and communicating with the containing means for filling the containing means;

a port means in said casing means, one port communicating with one chamber and the other port communicating with the other chamber;

a close fitting at one of said ports for admitting exhaust gas to one of said chambers;

venturi means connected to said close fitting and having means for aspirating air into said exhaust gas flow, said venturi means including an outer apertured tubular member having one end slidably receivable in said close fitting, and a venturi member secured within said outer tubular member and provided with a venturi throat portion, said throat portion having air aspirating orifices communicating with a chamber defined by said venturi member and said outer tubular member provided with said air aspirating means, the other end of said venturi member slidably receiving an exhaust gas pipe.

References Cited

UNITED STATES PATENTS

| | | | |
|---|---|---|---|
| 1,500,586 | 7/1924 | Jordahl | 55—483 |
| 2,747,976 | 5/1956 | Houdry | 23—288.3F |
| 3,068,079 | 12/1962 | Purse et al. | 60—29 |
| 3,209,531 | 10/1965 | Morris et al. | 60—30 |
| 3,307,920 | 3/1967 | Barnes | 23—288.3F |
| 3,355,258 | 11/1967 | Thomas | 23—288.3F |
| 3,434,806 | 3/1969 | De Rycke et al. | 23—288.3F |
| 3,441,381 | 4/1969 | Keith et al. | 23—288.3F |
| 2,909,415 | 10/1959 | Houdry | 23—288.3F |
| 3,090,676 | 5/1963 | Johnson | 60—29 |

FRANK W. LUTTER, Primary Examiner

B. NOZICK, Assistant Examiner

U.S. Cl. X.R.

55—468, 518; 60—30